May 13, 1941.  B. PINKEL  2,241,420

INTERCOOLER

Filed Dec. 6, 1939

N.A.C.A. cowling

INVENTOR
Benjamin Pinkel

Patented May 13, 1941

2,241,420

UNITED STATES PATENT OFFICE 2,241,420

INTERCOOLER

Benjamin Pinkel, Hampton, Va.

Application December 6, 1939, Serial No. 307,853

9 Claims. (Cl. 123—119)

(Granted under the act of March 3, 1883, as amended April 30, 1928; 370 O. G. 757)

This invention relates to intercoolers for engines, particularly, although not necessarily, for aircraft engines, and is an improvement over that shown in U. S. patent to King, 1,935,186, November 14, 1933, for Intake system for aircraft engines.

The installation of an intercooler on an aircraft engine presents a number of problems. In the case of the radial engine, the cooling air for the intercooler is generally obtained by means of scoops extending outside the engine cowling into the air stream. This arrangement tends to increase the drag horsepower of the airplane by an amount considerably greater than the power required for cooling the intercooler. The installation of the intercooler also disturbs the normal simple duct arrangement for distributing the charge from the supercharger to the engine cylinders.

Computations based on test data show that for the flow of gases around the outside of banks or rings of tubes a small number of banks or rings in the direction of the flow is more efficient than a large number. To obtain adequate cooling surface such an installation would require a large number of tubes in each bank or ring and would be impractical with the usual intercooler installation.

In this invention, an intercooler design is provided in which a small number of banks or rings of tubes in the direction of gas flow and a large number of tubes in each bank or ring may be used to obtain high efficiency. The intercooler fits very naturally into a radial engine and allows for a simple duct arrangement for distributing the engine charge. With the proposed arrangement, air for cooling the intercooler may be drawn from within the engine cowling and the usual air scoops in the air stream may be eliminated. This intercooler design further permits large increases in cooling surface areas and cooling capacities without appreciable increase in volume, and thus can easily be expanded to take care of the increased power which is being installed in a given cowling diameter.

With the foregoing and other objects in view the invention consists in the construction, combination and arrangement of parts hereinafter described and illustrated in the drawing, in which—

Figure 1:
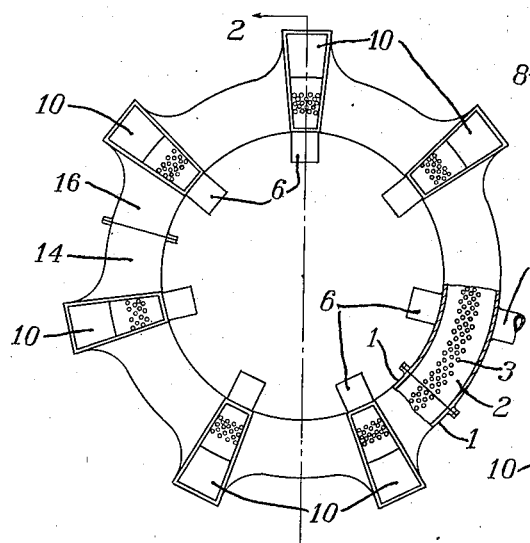
Fig. 1 is a front view partly in section of one embodiment of this invention.
Figure 2:
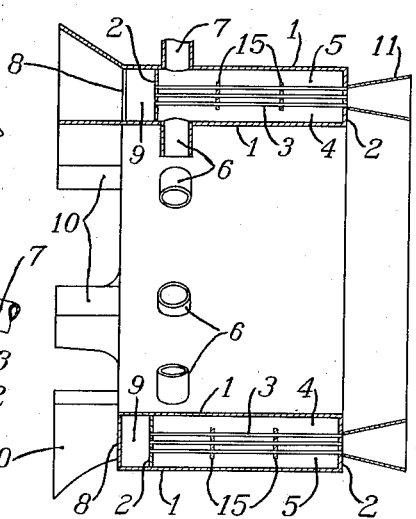
Fig. 2 is a sectional view taken on line 2—2 of Fig. 1.
Figure 3:
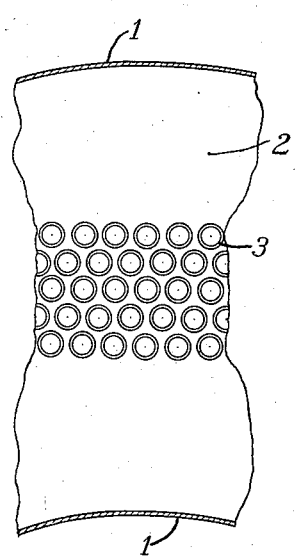
Fig. 3 is an enlarged fragmentary sectional view showing the tube arrangement.
Figure 4:
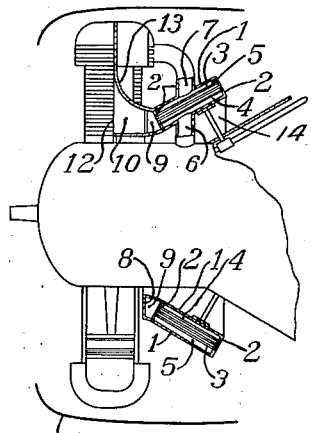
Fig. 4 is a sectional view illustrating an installation of the invention on a radial engine.

The intercooler shown in Figs 1 and 2 is one example of this invention. Referring to these figures, the casing sides are substantially surfaces of revolution about the central axes of the intercooler. Annular disks 2 are fastened to casing sides 1. Tubes 3 are arranged in a number of banks or rings and supported at each end in disks 2. The tubes 3 form an annular ring which divides the space within the casing into two annular chambers, an inner or inlet chamber 4 and an outer or outlet chamber 5. The tubes 3 in each bank or ring are uniformly spaced and a staggered arrangement between banks, as shown in Figs. 1 and 3, is preferred. The inner chamber 4 is provided with entrance passages 6 adapted to communicate with the exit of a supercharger. In Fig. 4, which shows one embodiment of applicant's invention, the passages are shown in communication with the supercharger casing 14. The outer chamber 5 is provided with exit passages 7 adapted to communicate with the inlet ports of the engine cylinders. Both chambers 4 and 5 are sufficiently large that no restriction to circumferential flow occurs. By this means when any cylinder draws its charge from the outlet chamber 5, the charge flows uniformly around all the tubes 3. Annular disks 15 are provided having holes through which the tubes 3 extend and hold the tubes together in their correct relation at points along the span of the tubes to add rigidity and prevent chafing of the tubes.

An annular plate 8 is fastened to the casing sides 1 to form an annular cooling air chamber 9. Inlet ducts 10 communicate with the annular chamber 9 and are adapted to provide cooling air either from the front of the engine or from a blower. The tubes 3 in communication with the chamber 9 allow a flow of cooling air through the tubes. Where space permits, a diffuser 11 is attached to the rear disk or plate 2 at the tube exit to allow recovery of the dynamic head in the cooling air stream.

The operation of the intercooler is as follows: The engine charge is delivered by the supercharger through entrance passages 6 to chamber 4. The charge is forced through the space between the tubes 3 into chamber 5 by the pressure difference in the chambers 4 and 5. The engine charge then flows from the outlet chamber 5 through the exit passages 7 to the engine cylinders. The inlet ducts 10 communicate either with the cowling space ahead of the engine, with a blower or other source of cooling air to the chamber 9. The cooling air flows through the tubes 3 and is expelled through the diffuser 11.

It is obvious that the intercooler can be made as part of a centrifugal blower in which the inlet chamber 4 can be the discharge chamber of the blower. It is also obvious that when installed on a conventional radial engine, changes in shape may be made to accommodate the engine installation. For example, in some cases, it may be expedient to have the intercooler in the form of a frustum of a cone.

Fig. 4 shows the intercooler installed on a conventional radial engine. The cooling air ducts 10 in Fig. 4 communicate with the cowling space in front of the engine through openings 12 in cylinder baffles 13 for obtaining cooling air. The walls of the duct 10 can be made to serve as part of the baffles for the engine; however, care must be used in construction that none of the air which cools the engine is drawn into the intercooler duct 10. The remainder of the parts in Fig. 4 are similar in function to similarly numbered parts in Figs. 1 and 2, and are described in the discussion of these figures.

The intercooler can be made in any desired number of sections which are fastened together to assist in assembly on the engine. Two sections 14 and 16 are shown in Fig. 1. When assembled, all joints are gas-tight.

When used with a two-row radial engine, a possible installation is to have the diameter of the intercooler somewhat less than the cowling diameter. The cooling air can then be drawn from the front of the engine by modifying the shape of duct 10 to pass between the cylinder heads and the cowling. The lengths of the ducts 6 and 7 are varied to accommodate each installation.

By virtue of the circular arrangement of tubes on a relatively large radius, Fig. 3, it is possible to have a large number of tubes arranged in a small number of banks or rings with a large number of tubes in each bank or ring. Because of the large number of parallel passages for the flow of the engine charge from the chambers 4 and 5 and because of the shortness of these passages, very close tube spacing and thus very narrow passages are permissible. This makes for very intimate contact of the charge with the tube walls and results in high cooling efficiency. The high efficiency of this arrangement is shown by calculations based on heat transfer coefficients obtained from test data.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. An intercooler characterized by being substantially annular in shape, having an annular chamber adapted to communicate with the exit of a supercharger, said intercooler being further characterized by having closely spaced cooling tubes extending through said annular chamber, said tubes being arranged in concentric rings, sufficient volume being provided in said inlet and outlet annular chambers on each side of the tubes for substantially unrestricted circumferential flow of fluid.

2. An intercooler of the class described characterized by having closely spaced tubes arranged in concentric rings with a large number of tubes in each ring, and a small number of rings, whereby a large number of short narrow passages are provided for the flow of fluid around and between the tubes, and being further characterized by having ducts communicating with the tube bores, said ducts being adapted to extend into the cowling space ahead of a radial engine for obtaining cooling air.

3. An intercooler characterized by being substantially annular in shape, and having an annular chamber adapted to communicate with the exit of a supercharger and with the inlet passages of the cylinders of an engine, said intercooler being further characterized by having closely spaced cooling tubes extending through said annular chamber, said tubes being arranged in concentric rings, sufficient volume being provided in said annular chamber on each side of the tubes for substantially unrestricted circumferential flow of the fluid, and ducts adapted to extend into the cowling space ahead of a radial engine for obtaining cooling air.

4. An intercooler of the class described characterized by having an annular chamber adapted to communicate with the exit of a supercharger and with the inlet passages of the cylinders of an engine, said intercooler being further characterized by having closely spaced cooling tubes extending through said annular chamber, said tubes being arranged in concentric rings, and ducts communicating with said tubes for providing cooling air.

5. An intercooler of the class described characterized by having an annular chamber adapted to communicate with the exit of a supercharger and with the inlet passages of the cylinders of an engine, said intercooler being further characterized by having closely spaced cooling tubes extending through said annular chamber, said tubes being arranged in concentric rings, an annular cooling air chamber in communication with the cooling tubes, and ducts in communication with said cooling air chamber for providing cooling air.

6. An intercooler of the class described characterized by having an annular chamber adapted to communicate with the exit of a supercharger and with the inlet passages of the cylinders of an engine, said intercooler being further characterized by having closely spaced cooling tubes extending through said annular chamber, said tubes being arranged in concentric rings, ducts in communication with one end of the cooling tubes for providing cooling air and a diffuser in communication with the other end of the cooling tubes for recovering the dynamic pressure of the cooling air stream.

7. An intercooler of the class described characterized by having an annular chamber adapted to communicate with the exit of the supercharger and with the inlet passages of the cylinders of an engine, said intercooler being further characterized by having closely spaced cooling tubes extending through said annular chamber, said tubes being arranged in concentric rings, said concentric rings dividing said annular chamber into an inlet annular chamber and an outlet annular chamber, an annular cooling air chamber in communication with the cooling tubes, and ducts in communication with said cooling air chamber for providing cooling air.

8. An intercooler of the class described characterized by having an annular chamber adapted to communicate with the exit of a supercharger and with the inlet passages of the cylinders of an engine, said intercooler being further characterized by having closely spaced cooling tubes extending through said annular chamber, said tubes being arranged in concentric rings, said concentric rings dividing said annular chamber into an inlet annular chamber and an outlet annular chamber, ducts in communication with one end of the cooling tubes for providing cooling air and a diffuser in communication with the other end of the cooling tubes for recovering the dynamic pressure of the cooling air stream.

9. An intercooler characterized by being substantially annular in shape, having an annular chamber adapted to communicate with the exit of a supercharger, said intercooler being further characterized by having closely spaced cooling tubes extending through said annular chamber, said tubes being arranged in concentric rings, said concentric rings dividing said annular chamber into an inlet annular chamber and an outlet annular chamber, sufficient volume being provided in said inlet and outlet annular chambers on each side of the tube rings for substantially unrestricted circumferential flow of fluid.

BENJAMIN PINKEL.